Oct. 12, 1954 — P. KLAMP — 2,691,435
ONE-WAY CLUTCH
Filed Sept. 16, 1949
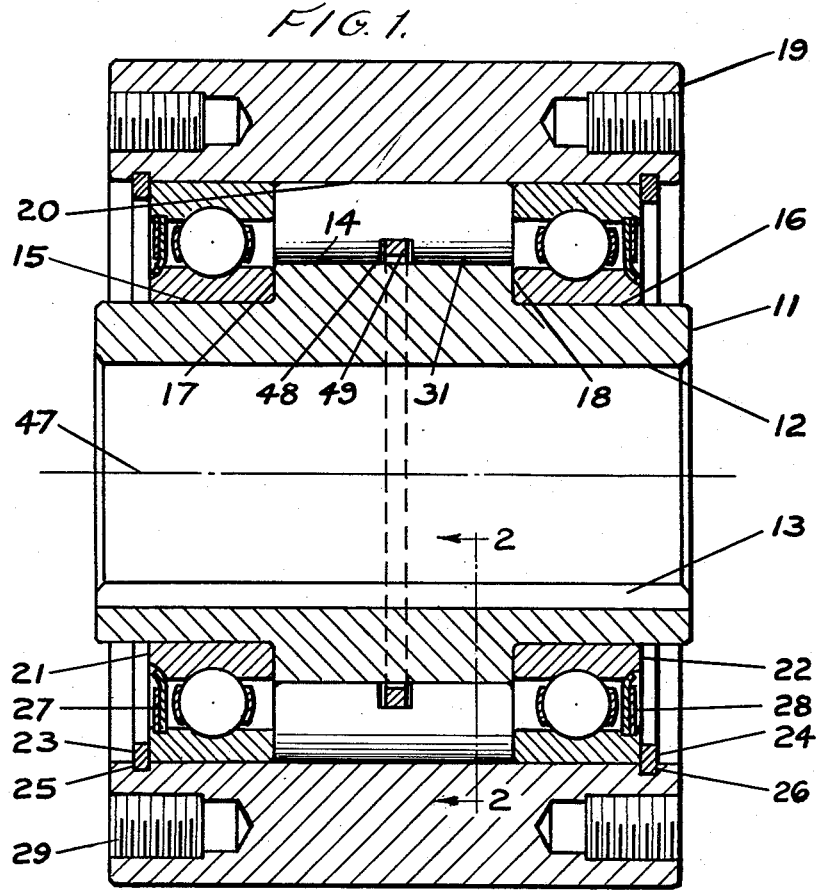
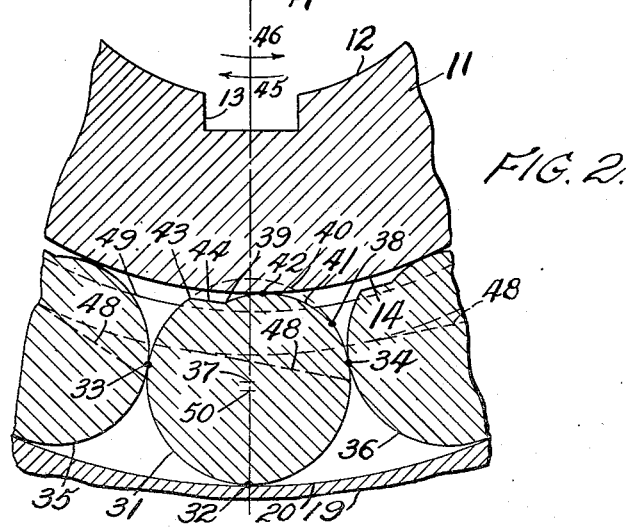
INVENTOR.
Paul Klamp Patented Oct. 12, 1954

2,691,435

UNITED STATES PATENT OFFICE 2,691,435

ONE-WAY CLUTCH

Paul Klamp, Detroit, Mich.

Application September 16, 1949, Serial No. 116,116

5 Claims. (Cl. 192—45.1)

The invention relates to one-way clutches of the type in which a series of wedge rollers is arranged between two co-axial, concentric cylindrical surfaces and adapted to produce driving engagement with said surfaces in one direction of rotation and free wheeling in the opposite direction.

One object of the invention is to provide accurate parallel alignment of the wedge rollers with the axis of the one-way clutch by forming and proportioning the cross sectional area of the wedge rollers in such a way that a very small clearance between adjacent rollers is obtained and is uniformly maintained when said rollers roll into and out of driving engagement. The purpose of such improved guiding of the clutch rollers is to avoid localized pressure peaks along the highly stressed, narrow contact areas between clutch rollers and rings. Uniform stress distribution demands precise alignment. This fact has long been recognized by manufacturers and users of roller bearings which present similar conditions.

Another object of the invention is to provide a stable equilibrium of the clutch rollers at higher operating speeds by forming the cross sectional area of each clutch roller in such a way that its center of gravity lies between its axis and its contact line at the outer clutch ring surface.

A third object is to provide more uniform control and distribution of the energizing pressure which urges the clutch rollers into wedging position.

Still another object is to provide clutch roller energizing means which can be installed more easily and without the use of tools.

The above and other objects and advantages are attained by the mechanism illustrated in the accompanying drawings in which Fig. 1 is a longitudinal cross section of the one-way clutch and Fig. 2 is an enlarged cross section on line 2—2 in Fig. 1.

Like numerals refer to like parts in both views.

The driving clutch member 11 has a central bore 12 and key way 13 for mounting on a drive shaft which is not shown. The periphery of said driving member consist of a cylindrical operating surface 14 and two ball bearing seats 15 and 16 with shoulders 17 and 18. The driven member 19 is provided with a cylindrical bore 20. The central part of said bore serves as the clutch operating surface while the outer portions serve as seats for the outer races of ball bearings 21 and 22. Two snap rings 23 and 24 are fitted in grooves 25 and 26 and serve to hold said ball bearings in place. The latter are provided with oil seals 27 and 28. Tapped holes 29 and 30 in the faces of driven member 19 serve to fasten the mechanism which is to be driven.

The annular space between surface 14 and the central part of bore 20 contains a full complement of wedge rollers 31 which are retained laterally by the outer races of ball bearings 21 and 22.

Each of said rollers 31 is substantially cylindrical. Its cylindrical form extends in both directions from contact line 32 at said driven member and continues toward and beyond the two lines of contact 33 and 34 with adjacent wedge rollers 35 and 36. The axis of said cylindrical form lies at 37. Between lines 38 and 39 the periphery is curved inwardly from the extended line 40 of the cylinder to form a wedging area 41 which contacts said driving member on line 42 and is joined with line 43 on the cylindrical periphery through a connecting surface 44.

Rotation of the driving member 11 in the direction of rotation 45 imparts a counter clockwise rotation to the wedge rollers, as seen in Fig. 2. The action of the wedge form 41 will now cause said rollers to wedge tightly between the driving and driven members, causing said driven member to rotate in the same direction 45.

Subsequent reversal of rotation of the driving member 11 to the direction of arrow 46 imparts an opposite, clockwise rotation to the wedge rollers, producing a loosening of the grip of the latter. If the driven member 19 offers but slight resistance to the rotation in the direction of arrow 46, the driving member 11 will turn freely to produce free wheeling action.

During the slight turning of the wedge rollers into and out of driving engagement, they roll along the cylindrical bore 20 of driven member 19. Therefore the axes 37 of the wedge rollers will remain equidistant from the axis 47 of the clutch. Consequently, the spacing of said axes 37 will remain unchanged. But, since the cylindrical form of each wedge roller extends inwardly beyond the contacts between wedge rollers, it follows that any initial small oil film clearance between wedge rollers will remain uniform during their rolling into and out of driving engagement. As a result, the wedge rollers will guide each other to maintain exact parallel positions with relation to the clutch axis 47. This, in turn, will produce uniform distribution of the wedging pressure over the full contact length.

Each wedge roller is provided with a central inclined slot 48. A piston ring 49 of the kind which retains a true circular periphery in its normal operating position is placed into the annular space formed by slots 48. The tendency of said piston ring to expand urges all wedge rollers to rotate into driving position. The true circular periphery of the piston ring assures equal rotative positions of all wedge rollers relative to their contacts with the driving and driven members, thus producing uniform wedge action. Said wedge action is light enough to permit free wheeling but sufficient to keep the wedge rollers poised for driving engagement.

Instead of said piston ring 49, an expanding type garter spring is often used for energizing the clutch members and may be used in connection with the clutch rollers 31. During assembly of a one-way clutch incorporating such a garter spring, the latter must be compressed uniformly all the way around. This requires a special tool. If the user of the clutch takes it apart for servicing or inspection, he will be unable to re-assemble it until he procures such a tool. This difficulty is avoided if a piston ring or similar device is used to energize the clutch rollers into driving engagement, because it is easily and quickly assembled by hand.

Due to the inwardly curved wedge area 41 and the inclined slot 48, the center of gravity 50 of each wedge roller is moved away from the axis 37, toward the contact line 32 at the driven member. Said wedge area and slot are proportioned in such a way that the center of gravity lies on the radial line 41—32. As a result, a stable equilibrium is obtained at high speed operation.

For illustration, if a cylindrical roller without such wedge area and slot is laid on a smooth and level table, the roller will stop in any rotationwise position in which it is placed. A very slight effort is sufficient to move it to another position. In contrast, the wedge roller as described, when laid on a smooth and level surface, will rock back and forth and come to a stop in one definite position, with the center of gravity 50 below axis 37. Again, a slight effort is sufficient to move the roller, but it will regain its original rest position. Consequently, the wedge roller will not merely maintain its position, but actually seek a definite position.

This action is important when the one-way clutch operates at high speeds where the centrifugal force of each clutch roller may exceed an amount equal to hundred times the weight of the roller. If the driving force is now removed by slowing down the driving member, the clutch rollers will not merely maintain, but seek to hold their normal positions, ready to be wedged into driving engagement at the instant the driving member is speeded up to drive the driven member.

While the form of the device disclosed and described herein is a preferred construction, it is understood that mechanical alterations can be made without departing from the basic principles underlying the invention and that all modifications which fall within the scope of the appended claims are intended to be included herein.

Having thus fully described my invention, what I claim as new and desire to secure by Letters Patent is:

1. A one-way clutch of the type having inner and outer spaced concentric cylindrical raceways, a series of wedging elements positioned therebetween and poising means normally urging each wedging element to wedged position; characterized by said wedging elements each having a basic cylindrical form of diameter greater than the distance between said raceways contacting said outer raceway, a segment removed from said basic cylindrical form to provide a curved wedging surface gradually tapering inwardly from the surface of said cylindrical form and contacting said inner raceway, said segment being terminated by a connecting surface extending between said curved wedging surface and said cylindrical form, said segment and the connecting surface thereof being proportioned to position the center of gravity of said wedging element substantially in a plane passing through the axis of said clutch and the line of contact between said outer raceway and said wedging element when said wedging element is in its poised position.

2. A one-way clutch of the type having inner and outer spaced concentric cylindrical raceways, a series of wedging elements positioned therebetween and poising means normally urging each wedging element to wedged position; characterized by said wedge elements each being formed from a cylinder having a diameter greater than the distance between said raceways and providing a surface for contact with said outer raceway and with each adjacent wedge element, a segment removed from said cylinder to provide a curved wedging surface gradually tapering inwardly from the surface of said cylinder and contacting said inner raceway, said segment being terminated by a connecting surface extending between said curved wedging surface and the surface of said cylinder, said segment and the connecting surface thereof being proportioned to position the center of gravity of said wedging element substantially in a plane passing through the axis of said clutch and the line of contact between said outer raceway and said wedging element when said wedging element is in its poised position.

3. A one-way clutch of the type having inner and outer spaced concentric cylindrical raceways, a series of wedging elements positioned therebetween and poising means normally urging each wedging element to wedged position; characterized by said wedge elements each having a basic cylindrical form of diameter greater than the distance between said raceway, said cylindrical form contacting said outer raceway, a wedge surface contacting said inner raceway, each wedge element further having a transverse slot adapted to receive said poising means, said wedge surface and said transverse slot each being formed by removing from the basic cylindrical form of each wedge element an unequal amount of material on both sides of a plane passing through the axis of said clutch and the line of contact of said wedge element with said outer raceway when in poised position, the amounts of material so removed being proportioned to maintain the center of gravity of each wedge element substantially in said plane.

4. A wedge element for a one-way clutch of the type having inner and outer spaced concentric cylindrical raceways adapted to be locked in one-way driving engagement by the wedging action of a series of such wedge elements positioned between said raceways and normally urged into wedged position by poising means, said wedge elements comprising a cylinder providing a surface for contacting said outer raceway and an adjacent wedge element, and a curved wedging surface for contacting said inner raceway formed on said cylinder by removing therefrom a segment having the shape of a curved wedge which is blunt at one end and tapers down to a sharp edge at the opposite end, thereby displacing the center of gravity of said wedge element from the geometric center of said cylinder towards the circumference thereof, and said curved wedge segment being proportioned to predetermine the position of the line of contact between said cylinder and said outer raceway under the effect of centrifugal force acting at the center of gravity of said wedge element.

5. In a one-way clutch of the type having two independently rotatable co-axial members provided with radially spaced outer and inner raceways, a series of closely spaced wedge rollers extending between and bearing against said raceways, each of said wedge rollers having a cylindrical form at the contact with said outer raceway and at the contacts with adjacent wedge rollers, and having a wedge portion at the contact with said inner raceway, said wedge portion being curved inwardly from the cylindrical surface of said wedge roller by removing a segment from said cylindrical surface, said segment having the cross-sectional form of a curved wedge which is blunt at one end and tapers down to a sharp edge at the opposite end, thereby displacing the center of gravity of said wedge roller from the geometric center of said cylindrical form thereof toward the circumference of said cylindrical form, each wedge roller further having a transverse slot inclined in diverging relationship from said blunt end of said wedge portion, said curved wedge segment and said transverse slot being proportioned to predetermine the position of the line of contact between the cylindrical portion of said wedge roller and said outer raceway under the effect of centrifugal force acting at the center of gravity of said wedge roller, and an expanding ring positioned in the annular space formed by said transverse slots and adapted to produce normal rotation of said wedge rollers on said outer raceway into driving engagement with said raceways.

References Cited in the file of this patent

UNITED STATES PATENTS

| Number | Name | Date |
|---|---|---|
| 2,023,961 | Leichsenring, Jr. | Dec. 10, 1935 |
| 2,028,876 | Lotts | Jan. 28, 1936 |

FOREIGN PATENTS

| Number | Country | Date |
|---|---|---|
| 756,885 | France | Dec. 16, 1933 |